No. 752,571. PATENTED FEB. 16, 1904.
E. LYTTON.
MACHINERY FOR RAISING OR LOWERING STAGE SCENERY, &c.,
OF THEATERS.
APPLICATION FILED AUG. 28, 1903.
NO MODEL. 2 SHEETS—SHEET 1.
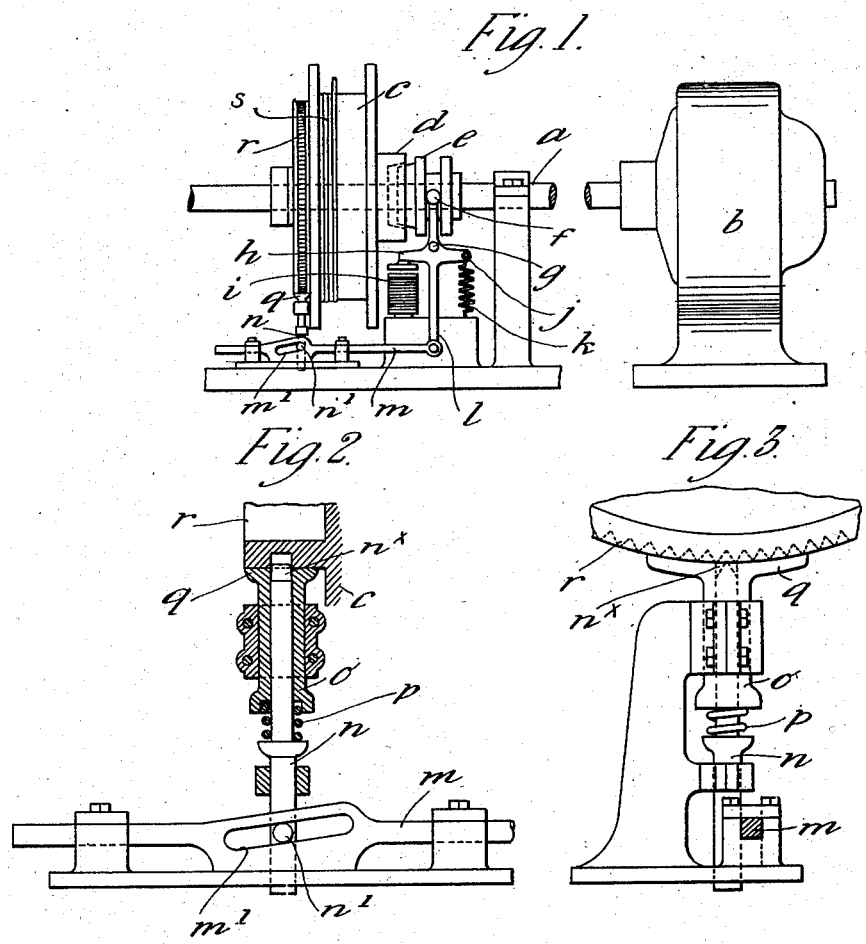
Witnesses
Inventor
Edward Lytton No. 752,571. PATENTED FEB. 16, 1904.
E. LYTTON.
MACHINERY FOR RAISING OR LOWERING STAGE SCENERY, &c.,
OF THEATERS.
APPLICATION FILED AUG. 28, 1903.
NO MODEL. 2 SHEETS—SHEET 2.
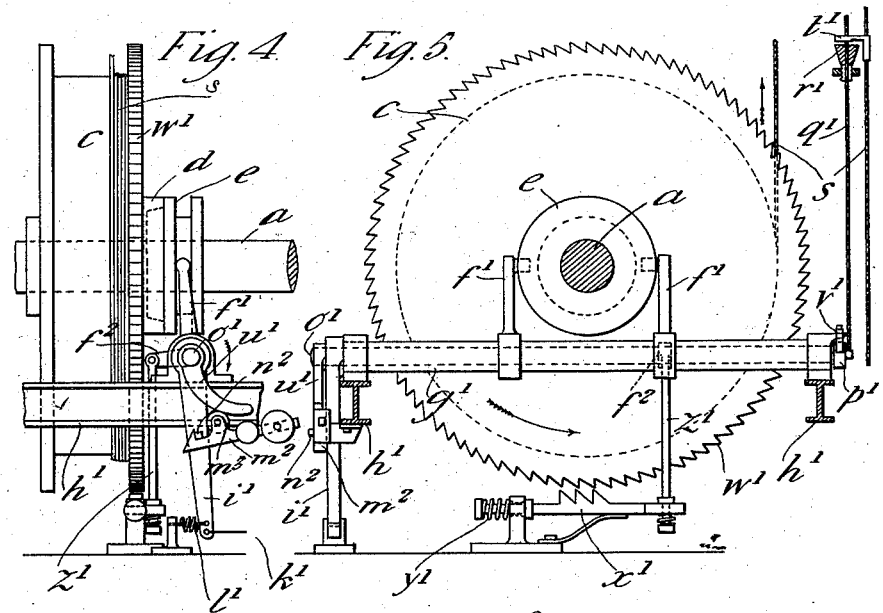
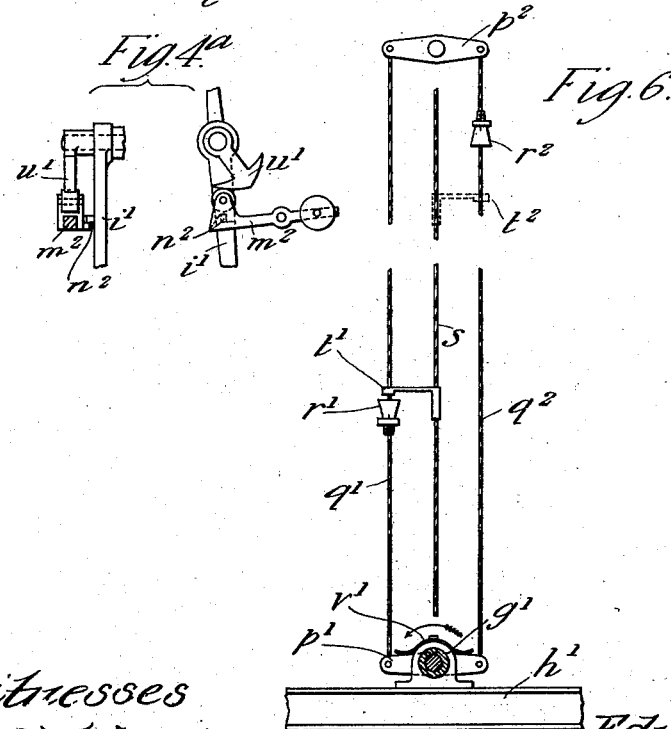
Witnesses
Inventor
Edward Lytton
By
James L. Norris
Atty.

No. 752,571. Patented February 16, 1904.

UNITED STATES PATENT OFFICE.

EDWARD LYTTON, OF LONDON, ENGLAND.

MACHINERY FOR RAISING OR LOWERING STAGE SCENERY, &c., OF THEATERS.

SPECIFICATION forming part of Letters Patent No. 752,571, dated February 16, 1904.

Application filed August 28, 1903. Serial No. 171,134. (No model.)

*To all whom it may concern:*

Be it known that I, EDWARD LYTTON, a subject of the King of Great Britain and Ireland, residing at No. 24ª Regent street, London, England, have invented certain new and useful Improvements in Machinery for Raising or Lowering the Stage Scenery and Cloths of Theaters and the Like, of which the following is a specification, and for which I have applied for a patent in Great Britain, filed June 15, 1903, No. 13,364; in France, filed July 10, 1903, No. 323,752, and in Germany, filed July 11, 1903.

In the specification to my patent No. 722,597, of March 10, 1903, I described machinery for raising and lowering the stage scenery and cloths in theaters and the like, consisting of a series of pulleys arranged on the floor of the flies on which were coiled ropes or bands from which were suspended the pieces of scenery, which pulleys were rotated in one direction or the other by a motor-engine, so as to either raise up the scenery from the stage into the flies or to lower the same from the flies to the stage. In the arrangement there described the said pulleys were mounted loose on a shaft and each one was connected by worm-wheel gear to a shaft, which in its turn was connected by toothed gear and clutch apparatus to a main driving-shaft driven in one direction or the other by an electric or other motor.

My present invention has for its object to considerably simplify the said mechanism in dispensing entirely with the second and third above-mentioned shafts and the worm and worm-wheel gear and driving the pulleys that raise and lower the scenery direct from the motor. For this purpose the shaft on which the pulleys are mounted loose is driven in one direction or the other by the motor either directly or through suitable transmitting-gear, preferably worm-gear. Each pulley has attached to it the one part of a clutch device, the other part of which is mounted on the shaft, so as to revolve therewith, but to be capable of sliding thereon, so as to engage with or be disengaged from the part on the pulley, whereby the latter can either be rotated in one direction or the other by the shaft or remain stationary. The movable part of the clutch is operated by a lever or other suitable device, which in its turn is worked either by an electromagnet the electric circuit of which is led to a switchboard on the stage, or the clutch-levers may be actuated by any suitable mechanical transmission device from the stage or by hydraulic pressure.

Figure 1 of the accompanying drawings shows a side view of the above-described arrangement for actuating the pulleys. Figs. 2 and 3 show enlarged details. Upon a shaft $a$, driven by an electromotor $b$, is mounted loose the pulley $c$, on which is coiled the cord or band from which the cloth or piece of scenery is suspended, the pulley being suitably confined between collars on the shaft. On the one side of the pulley is formed or fixed the one part $d$ of a conical or other friction-clutch, the other part $e$ of which can slide longitudinally upon but revolves with the shaft and has engaged with its neck a forked lever $f$, mounted on a fixed fulcrum at $g$, and having an arm $h$, to which is attached the armature of an electromagnet $i$, whose coil is included in the circuit of a battery, the wires of the circuit being led to a switch on the stage, so that on closing the circuit by means of such switch the electromagnet $i$ actuates the lever $f$, so as to bring the friction-clutch $d$ $e$ into engagement, and thus cause the pulley $c$ to be rotated by the shaft $a$ either for raising or for lowering the piece of scenery, the rotation of the motor $b$ in one direction or the other for this purpose being also effected by a reversing-switch on the stage. A second arm $j$ on lever $f$ is connected to a spring $k$, which causes the lever to draw the clutch out of engagement when the circuit of the electromagnet is broken and thus to prevent the pulley $c$ from being further rotated by the shaft $a$. A third arm $l$ of lever $f$ is connected to a rod $m$, having an inclined loop $m'$, with which is engaged a pin $n'$ on a rod $n$, the upper end $n^x$ of which is formed as a pawl adapted to engage with notches in a ring $r$, projecting from the side of the pulley $c$. On the rod $n$ is fitted a sliding sleeve $o$, supported from a collar on the rod by a spring $p$ and having its upper end $q$ formed so as to act as a brake-block bearing against the ring $r$, the spring being made to hold the sleeve so that the surface of $q$ is slightly above the end $n^×$ of rod $n$ when disengaged. From this arrangement it will be seen that when the circuit of the electromagnet is broken, as described, and the spring $k$ draws the clutch $e$ out of engagement the movement of lever-arm $l$ causes the looped bar $m$ to slide to the left hand, and thereby to raise rod $n$ and sleeve $o$ until the end $q$ of the latter presses against the ring $r$, and thus retards or stops the rotation of the pulley, while by the continued upward motion of rod $n$ its end $n^×$ then engages with the notches of ring $r$, and thus locks pulley $c$ in the position into which it has been brought. On the circuit of the electromagnet $i$ being closed lever-arm $l$ is actuated, so as to cause the looped bar $m$ to withdraw rod $n$ from its engagement with $r$, after which the brake $q$ will also descend, thus leaving pulley $c$ free to be rotated by shaft $a$.

Figs. 4, 5, and 6 show a modified construction of the above-described apparatus. As before, the pulley $c$, loose on the motor-shaft $a$, is geared thereto by a friction-clutch $d$ $e$. The levers $f'$, actuating the part $e$ of the clutch, are fixed on a transverse tubular shaft $g'$, carried on longitudinal bearers $h'$ and having at one end a lever $i'$, to which is attached a cord $k'$, that may be either connected to the armature-lever of an electromagnet controlled by a switchboard on the stage, as described with reference to the first arrangement, or the cord may be led over guide-rollers to a hand-pull on the stage for moving the clutch into gear by hand. When the clutch is put in gear, it is secured in that position by a catch $m^2$, pivoted to the bearer $h'$ and engaging with a stud $n^2$, projecting from the side of lever $i'$. The lever $i'$ is also connected to a spring $l'$, that tends to pull it, so as to move the clutch out of gear when the catch $m^2$ is disengaged from lever $i'$. Through the hollow shaft $g'$ passes a shaft $o'$, whose ends project beyond $g'$. The one end carries a two-armed lever $p'$, Fig. 6, to the ends of which are attached two cords $q'$ $q^2$, extending up to the top of the flies, where they are connected to a similar lever $p^2$. On these cords are adjustably attached stops $r'$ $r^2$, one of which is attached to the lower part of the one cord, while the other is attached to the upper part of the other cord. To the cloth or piece of scenery or to the lifting-cord $s$, that is raised and lowered by the pulley $c$, are attached eyes $t'$ $t^2$, that slide along the cords $q'$ $q^2$ as the cloth is raised or lowered. The stops $r'$ $r^2$ are adjusted in such positions that when the cloth has arrived at or near the lowest or highest position which it is to assume the one or other of the eyes $t'$ $t^2$ presses upon the stop $r'$ or $r^2$, thereby moving the cord $q'$ or $q^2$, so as to turn the lever $p'$, and consequently the shaft $o'$, through a certain angle in the direction of the arrow. The other end of shaft $o'$ has a cam-shaped arm $u'$ fixed to it, which when the shaft and lever $p'$ are in the position shown at Fig. 6 (in which they are normally held by a spring $v'$, secured to the bracket-carrying shafts $g'$ and $o'$) is in contact with a roller $m^3$ on catch $m^2$, so that when shaft $o'$ is turned as the cloth or cord $s$ arrives at the end of its travel, as before described, the arm $u'$ in depressing catch $m^2$ disengages it from lever $i'$, whereupon clutch $e$ is thrown out of gear by spring $l'$ and the pulley $c$ ceases to be rotated.

Instead of making the cam $u'$ of the shape shown at Fig. 4 it can be made with double action, as shown at Fig. 4$^a$, so that it will move the pawl $m^2$ out of gear with the lever $i'$, whether the shaft $o'$ be turned in the one direction or in the other, thus doing away with the necessity of bringing the lever $p'$ back to the middle position by a spring after it has been turned by the cord $q'$ or $q^2$.

The one rim of pulley $c$ is formed with ratchet-teeth $w'$, with which can be engaged the teeth of a pawl $x'$. The stem of this pawl passes loosely through a fixed block and has a spring $y'$ mounted on it between the block and a nut on its rear end, as shown at Fig. 5. At its front end it has a rod $z'$ passing through it, which rod is pivoted to a short arm $f^2$ on the boss of one of the clutch-levers $f'$. The rod $z'$ and arm $f^2$ are so arranged relatively to the levers $f'$ that when these move the clutch $e$ into engagement with the pulley $c$ the rod $z'$ is made to depress pawl $x'$ out of engagement with the ratchet-teeth $w'$, while when the clutch is thrown out of gear rod $z'$ in rising brings the pawl into gear with the pulley $c$ and stops it from turning backward, which it would otherwise do owing to the pull exercised upon its cord in the direction of the arrow, Fig. 5, by the weight of the cloth $s$.

The arrangement is such that the pawl $x'$ is brought into engagement at the moment when the clutch is disengaged, and in order to allow of any slight further rotation of the pulley $c$ due to its momentum after the pawl is engaged the spring connection $y'$ of the latter with its bracket is provided for enabling a slight longitudinal motion of the pawl in following the pulley when turning in the direction of the arrow. The pawl is also provided with spring action in the vertical direction, as shown, so that if brought into engagement while the pulley is still revolving in the direction contrary to the arrow the teeth can slip past it.

Having thus described the nature of this invention and the best means I know of carrying the same into practical effect, I claim—

1. In machinery for raising and lowering pieces of stage scenery, a shaft adapted to be rotated in either direction by a motor, a pulley mounted loose on said shaft having the lifting and lowering cord of a piece of scenery attached to its periphery, a friction-clutch upon said shaft adapted to engage with said pulley so as to carry it around with the shaft, a clutch-lever operating said friction-clutch, a catch adapted to lock said clutch-lever in the engaged position and a locking device operating in connection with the clutch-gear and adapted to lock the pulley when the clutch is moved out of engagement and to free the pulley when the clutch is moved into engagement, substantially as described.

2. In machinery for raising and lowering pieces of stage scenery, a shaft adapted to be rotated in either direction by a motor, a pulley mounted loose on said shaft having the lifting and lowering cord of a piece of scenery attached to its periphery, a friction-clutch upon said shaft adapted to engage with said pulley so as to carry it round with the shaft, a clutch-lever operating said friction-clutch, a catch adapted to lock said clutch-lever in the engaged position, a cam adapted to disengage the catch from the lever, and means for automatically actuating said cam when the piece of scenery has been raised or lowered to the desired position, substantially as described.

3. In machinery for raising and lowering pieces of stage scenery, a shaft adapted to be rotated in either direction by a motor, a pulley mounted loose on said shaft having the lifting and lowering cord of a piece of scenery attached to its periphery, a friction-clutch upon said shaft adapted to engage with said pulley so as to carry it round with the shaft, a clutch-lever operating said friction-clutch, a catch adapted to lock said clutch-lever in the engaged position, a cam adapted to disengage the catch from the lever, means for automatically actuating said cam when the piece of scenery has been raised or lowered to the desired position, and a locking device operating in connection with the clutch-gear and adapted to lock the pulley when the clutch is moved out of engagement, and to free the pulley when the clutch is moved into engagement, substantially as described.

4. In machinery for raising and lowering pieces of stage scenery, a shaft adapted to be rotated in either direction by a motor, a pulley mounted loose on said shaft having the lifting and lowering cord of a piece of scenery attached to its periphery, a friction-clutch upon said shaft adapted to engage with said pulley so as to carry it round with the shaft, a tubular shaft carrying the clutch-lever, a catch adapted to lock said clutch-lever in the engaged position, a shaft passing through the tubular shaft and carrying at one end a cam adapted to disengage the catch from the clutch-lever, and at the other end a two-armed lever to which are attached the lower ends of two vertical cords having their upper ends attached to a second two-armed lever, adjustable stops on said cords, eyes attached to the cord of the raising and lowering pulley, adapted to come in contact with said stops so as to cause the two-ended lever and its shaft to be rotated so as to disengage said catch when the piece of scenery has to be raised or lowered to the desired position and a spring acting upon the clutch-lever so as to move the clutch out of engagement when the lever is free of the catch, substantially as described.

In testimony whereof I have signed my name to this specification in the presence of two subscribing witnesses.

EDWARD LYTTON.

Witnesses:
OLIVER IMRAE,
EDWARD GARDNER.